US010473846B2

(12) United States Patent
Liu (10) Patent No.: US 10,473,846 B2
(45) Date of Patent: Nov. 12, 2019

(54) ILLUMINATION SYSTEM (71) Applicant: 3M INNOVATIVE PROPERTIES COMPANY, St. Paul, MN (US)

(72) Inventor: Tao Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/080,317

(22) PCT Filed: Feb. 24, 2017

(86) PCT No.: PCT/US2017/019251
§ 371 (c)(1),
(2) Date: Aug. 28, 2018

(87) PCT Pub. No.: WO2017/151412
PCT Pub. Date: Sep. 8, 2017

(65) Prior Publication Data
US 2019/0072708 A1 Mar. 7, 2019

Related U.S. Application Data (60) Provisional application No. 62/301,660, filed on Mar. 1, 2016.

(51) Int. Cl.
*F21S 43/237* (2018.01)
*F21V 8/00* (2006.01)
(Continued)

(52) U.S. Cl.
CPC ......... *G02B 6/0063* (2013.01); *B60Q 1/2607* (2013.01); *B60Q 1/2611* (2013.01);
(Continued)

(58) Field of Classification Search
CPC ...... G02B 6/0063; G02B 6/001; G02B 6/035; G02B 6/0006; F21S 43/237; F21S 43/249;
(Continued)

(56) References Cited

U.S. PATENT DOCUMENTS 6,464,365 B1 10/2002 Gunn
2002/0159741 A1* 10/2002 Graves ................ B60Q 1/26
385/133
(Continued)

FOREIGN PATENT DOCUMENTS

WO WO 2001-002772 1/2011
WO WO 2016-077110 5/2016

OTHER PUBLICATIONS

International Search Report for PCT International Application No. PCT/US2017/019251, dated May 30, 2017, 5 pages.

*Primary Examiner* — Julie A Bannan
(74) *Attorney, Agent, or Firm* — Jonathan L. Tolstedt (57) ABSTRACT

An illumination system includes a lightguide having light extractors. A first light source is disposed at an end face of the lightguide. Light emitted by the first light source is extracted from the lightguide by the light extractors and exits the lightguide primarily along a first direction different than the length direction. A second light source is disposed along the length of the lightguide. Light emitted by the second light source enters the lightguide from a first side surface and exits the lightguide from a different second side surface along a second direction different than the first and length directions. Light emitted by the second light source has a first divergence in a first plane before entering the lightguide through the first side surface and a different second divergence in the first plane after exiting the lightguide from the second side surface.

17 Claims, 7 Drawing Sheets (51) Int. Cl.
- *B60Q 1/26* (2006.01)
- *B60Q 1/32* (2006.01)
- *F21S 43/245* (2018.01)
- *F21S 43/249* (2018.01)
- *F21S 4/20* (2016.01)
- *F21V 14/00* (2018.01)
- *F21S 43/19* (2018.01)
- *F21S 43/20* (2018.01)

(52) U.S. Cl.
CPC .......... *B60Q 1/2661* (2013.01); *B60Q 1/323* (2013.01); *F21S 4/20* (2016.01); *F21S 43/237* (2018.01); *F21S 43/245* (2018.01); *F21S 43/249* (2018.01); *F21V 14/006* (2013.01); *G02B 6/001* (2013.01); *G02B 6/0035* (2013.01); *G02B 6/0068* (2013.01); *F21S 43/19* (2018.01); *F21S 43/26* (2018.01); *G02B 6/0006* (2013.01); *G02B 6/006* (2013.01); *G02B 6/0036* (2013.01); *G02B 6/0038* (2013.01)

(58) Field of Classification Search
CPC ....... F21S 4/20; B60Q 1/2611; B60Q 1/2661; B60Q 1/323
See application file for complete search history.

(56) References Cited

U.S. PATENT DOCUMENTS

| | | |
|---|---|---|
| 2005/0007753 A1 | 1/2005 | Van Hees |
| 2012/0099343 A1 | 4/2012 | Ender |
| 2012/0280528 A1* | 11/2012 | Dellock .............. B60R 1/06 296/1.08 |
| 2015/0153023 A1 | 6/2015 | Jepsen |
| 2015/0330593 A1* | 11/2015 | Larsen ............... B60Q 1/2607 362/511 |
| 2016/0215950 A1* | 7/2016 | Ender ................ B60Q 1/0058 |

* cited by examiner

ILLUMINATION SYSTEM

TECHNICAL FIELD

This disclosure relates generally to illumination systems comprising lightguides.

BACKGROUND

Light fibers can be used for linear lighting applications on automobiles, commercial buildings, and other structures. Such light fibers can provide lighting patterns that are both aesthetically pleasing and illuminating.

BRIEF SUMMARY

An illumination system includes an elongated lightguide that extends along a length direction of the lightguide between opposing first and second end faces of the lightguide. The lightguide includes a plurality of first light extractors extracting light that would otherwise be confined within the lightguide in mutually orthogonal lateral directions perpendicular to the length direction and propagate within the lightguide along the length of the lightguide primarily by total internal reflection. A first light source is disposed at the first end face of the lightguide. Light emitted by the first light source enters the lightguide from the first end face and is extracted from the lightguide by the first light extractors. The light extracted by the first light extractors exits the lightguide primarily along a first direction different than the length direction. A second light source is disposed along the length of the lightguide between the first and second end faces. Light emitted by the second light source enters the lightguide from a first side surface of the lightguide and exits the lightguide from a different second side surface of the lightguide along a second direction different than the first and length directions. The first and second side surfaces extend between the first and second end faces. Light emitted by the second light source having a first divergence in a first plane before entering the lightguide through the first side surface and a different second divergence in the first plane after exiting the lightguide from the second side surface.

According to some embodiments, an illumination system includes an elongated lightguide extended along a length direction of the lightguide between opposing first and second end faces of the lightguide and comprising at least one first light extractor and at least one second light extractor disposed between the first and second end faces. A light source is disposed along the length of the lightguide between the first and second end faces and facing the at least one second light extractor. A second light portion emitted by the light source redirected by the at least one second light extractor and propagating within the lightguide toward at least one of the first and second end faces primarily by total internal reflection. The propagating light being extracted by the at least one first light extractor and exiting the lightguide primarily along a first direction. A first light portion emitted by the light source entering the lightguide from a first side surface of the lightguide and exiting the lightguide from a different second side surface of the lightguide primarily along a different second direction without going through the at least one second light extractor.

According to some embodiments an illumination system comprises a structure configured to mount on the vehicle. The structure includes an elongated lightguide extending along a length direction of the lightguide between opposing first and second end faces of the lightguide. The lightguide comprises a plurality of first light extractors extracting light that would otherwise be confined within the lightguide in mutually orthogonal lateral directions perpendicular to the length direction and propagate within the lightguide along the length of the lightguide primarily by total internal reflection. A first light source is disposed at the first end face of the lightguide. Light emitted by the first light source enters the lightguide from the first end face and is extracted by the first light extractors exiting the lightguide primarily along a first direction different than the length direction. A second light source is disposed along the length of the lightguide between the first and second end faces. Light emitted by the second light source enters the lightguide from a first side surface of the lightguide and exits the lightguide from a different second side surface of the lightguide along a second direction different than the first and length directions. The first and second side surfaces extending between the first and second end faces. Light emitted by the second light source has a first divergence in a first plane before entering the lightguide through the first side surface and a different second divergence in the first plane after exiting the lightguide from the second side surface.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

In some applications, such as illuminated step-assist, illuminated roofrack, and/or illuminated truck bed rails for cars, trucks and/or sport utility vehicles, light emitted from light fibers may be used to illuminate the ground and/or portions of the vehicle. For these applications, consumers would like to have a fully functional illumination system that provides sufficient illumination to see by and also has an appealing appearance that may include accent lighting. In some illumination system implementations, the use of a light source having lighting devices oriented only along the edge of the lightguide requires design tradeoffs and may not provide both optimal functional lighting and optimal accent lighting. Additionally, in such illumination system implementations it can be complex to separately control the intensity and/or operation of the functional lighting and the accent lighting.

Some embodiments disclosed herein are directed to an illumination system that includes a light source oriented along the side of the lightguide. The lightguide includes first and second light extractors. The second light extractors redirect a second portion of the light entering the lightguide from the light source toward one or both end faces of the lightguide primarily by total internal reflection. The propagating light is extracted by a first light extractor and exits the lightguide primarily along a first direction. A first portion of light emitted by the light source that enters the lightguide exits the lightguide primarily along a different second direction without going through a second light extractor. The light that is emitted along the first direction may be used to provide accent lighting and the light that is emitted along the second direction may be used to provide functional lighting according to some implementations.

Some embodiments disclosed herein relate to illumination systems that include at least two differently oriented light sources, at least one light source oriented at an edge of a lightguide and at least one light source oriented at a side of the lightguide. The illumination system is configured so that the first source provides primarily accent lighting and the second light source provides primarily functional lighting. The functional lighting may be provided by a light source oriented along a side of the lightguide and/or mounted behind the lightguide from the perspective of the viewer. Light emitted from the side-oriented light source can pass through the light guide and, in some embodiments, may be collimated in some planes by the exit surface, e.g., rounded exit surface, of the lightguide while diverging or not being collimated in other planes. It is possible to achieve high functional efficiency for this light since there is little lightguide material absorption of the light emitted by the side oriented light source. Accent lighting is provided by at least one light source that injects light into the lightguide from an end of the lightguide. The light from the one or more light sources that inject light from the lightguide ends propagates through the lightguide by total internal reflection, and is then extracted by accent features defined on the surface of the lightguide. According to some aspects of the various embodiments, the functional and accent lighting may be controlled separately, with different viewing directions, operation, and/or intensity.

Figure 1:
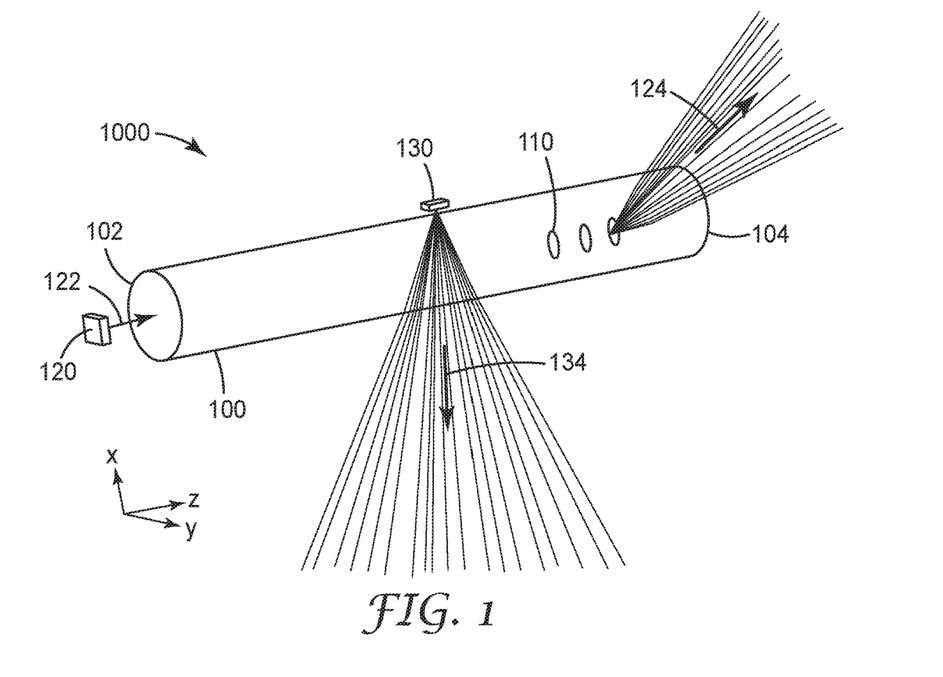
FIG. 1 is a perspective view of an illumination system in accordance with some embodiments.
Figure 2A:
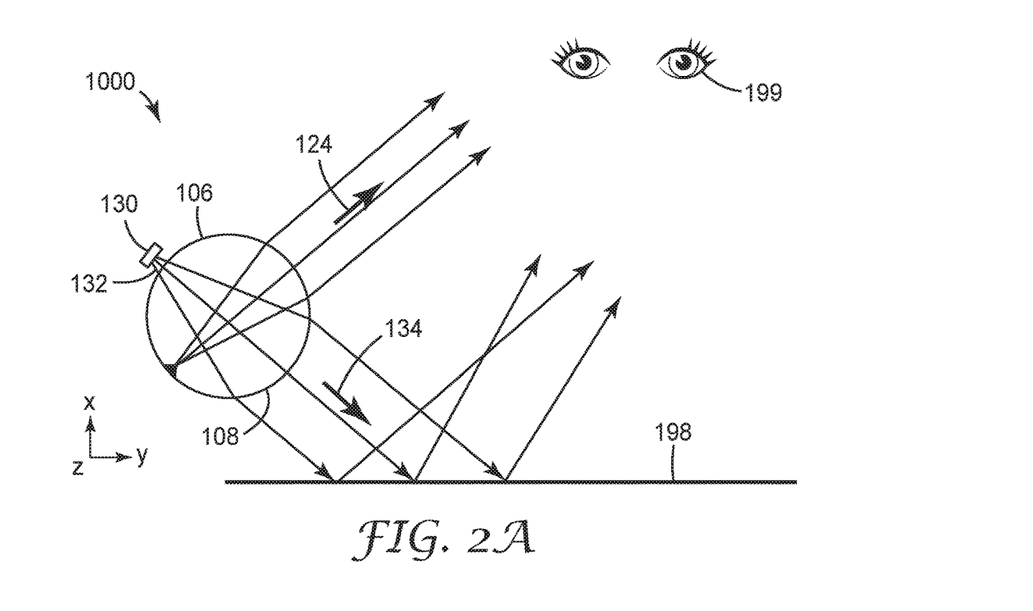
FIG. 2A is a cross sectional view of the illumination system of FIG. 1.
Figure 3A:
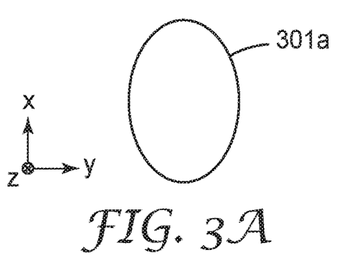
FIGS. 3A through 3G illustrate cross sectional profiles of the lightguide in accordance with various embodiments.
Figure 3B:
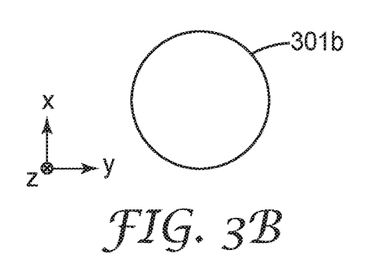
Figure 3C:
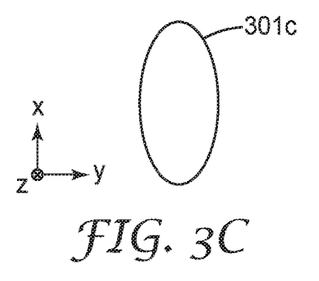
Figure 3D:
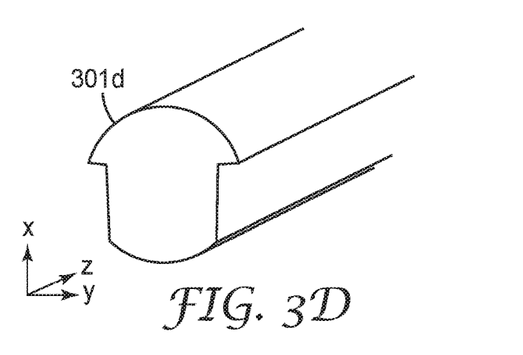
Figure 3E:
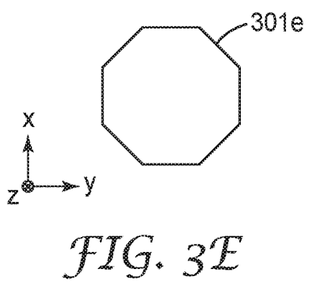
Figure 3F:
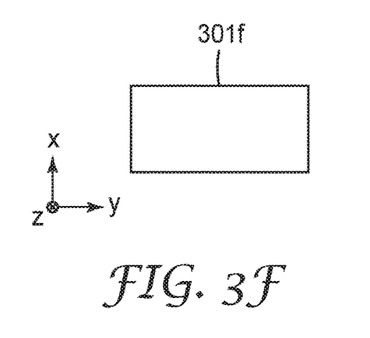
Figure 3G:
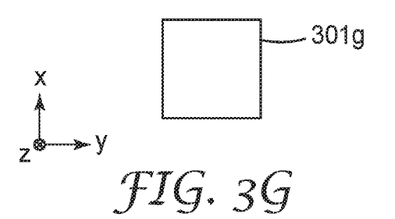

Turning now to FIG. 1, an illumination system 1000 provides both functional and accent lighting in accordance with some embodiments. FIG. 1 provides a perspective view and FIG. 2A provides a cross sectional view of the illumination system 1000. The illumination system 1000 includes an elongated lightguide 100 that extends along a length direction Z of the lightguide 100 between opposing first 102 and second 104 end faces. In various embodiments, the lightguide may be a non-planar lightguide and/or may have a variety of cross sectional profiles along the length direction Z as illustrated by FIGS. 3A through 3G. FIG. 3A shows a lightguide 301a having a round cross sectional profile; FIG. 3B shows a lightguide 301b having a circular cross sectional profile; FIG. 3C illustrates a lightguide 301c having an elliptical cross sectional profile; and FIG. 3D shows a lightguide 301d having a mushroom shape cross sectional profile. In some embodiments, the cross sectional profile of the lightguide 301e may be a polygon as illustrated in FIG. 3E. FIG. 3F shows a lightguide 301f that has a square cross sectional profile and FIG. 3G shows a lightguide 301g that has a rectangular cross sectional profile.

Figure 2B:
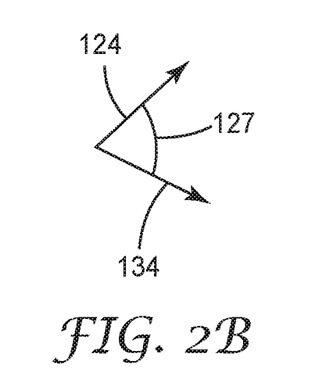
FIG. 2B shows an angular relationship between the light emerging from the lightguide of FIG. 2A.
Figure 2C:
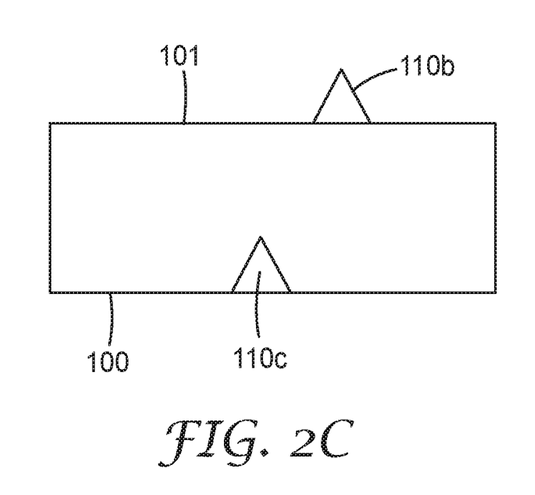
FIG. 2C illustrates extraction features of the lightguide of FIG. 1 in accordance with some embodiments.

The lightguide 100 includes a plurality of first light extractors 110 configured to extract light that would otherwise be confined within the lightguide 100 in mutually orthogonal lateral directions X,Y perpendicular to the length direction Z. The light confined within the lightguide 100 propagates within the lightguide 100 along the length of the lightguide 100 primarily by total internal reflection. According to various implementations, as illustrated by FIG. 2C, at least some of the first light extractors may be protrusions 110b formed on the exterior surface 101 of the lightguide 100 and/or at least some of the first light extractors may be notches 110c formed in the exterior surface 101 of the lightguide 100.

At least one first light source 120 is disposed at the first end face 102 of the lightguide 100. Light 122 emitted by the first light source 120 enters the lightguide 100 from the first end face 102 and is extracted by the first light extractors 110. Light 122 exits the lightguide 100 primarily along a first direction 124 that is different from the length direction Z. As illustrated in FIG. 2A, the light that exits the lightguide 100 along the first direction 124 may be directed toward a viewer 199. The light that exits the lightguide 100 along first direction 124 may provide relatively low illumination accent lighting that is decorative rather than functional to illuminate a surface. According to some optional aspects, the accent lighting may comprise accent features including one or more of a word, a design, and a logo.

At least one second light source 130 is disposed along the length of the lightguide 100 between the first 102 and second 104 end faces of the lightguide 100. Light 132 emitted by the second light source 130 enters the lightguide 100 from a first side surface 106 of the lightguide 100 and exits the lightguide 100 from a different second side surface 108 of the lightguide 100 along a second direction 134 different than either of the first 124 and length directions Z. The first 106 and second 108 side surfaces extend between the first 102 and second 104 end faces. As indicated in FIG. 2B, an angle 172 between the first 124 and second 134 directions may be in a range from about 20 degrees to about 100 degrees, for example.

The light that exits the lightguide 100 along the second direction 134 can provide relatively high illumination functional lighting. As illustrated in FIG. 2A, in some embodiments, such as running board and/or roof rack lighting on an automobile, the light that exits the lightguide 100 along second direction 134 may illuminate the ground or other surface 198 from the perspective of the viewer 199. In some embodiments, the intensity of the light emitted from the lightguide 100 along direction 124 may be less than 20%, less than 15%, less than 10% or even less than 5% of the intensity of the light that exits the lightguide 100 along the second direction 134.

The first light source 120 and/or the second light source 130 may comprise one or more of any suitable type of light emitting device such as a light emitting diode, a filament based bulb, and/or an incandescent lamp, for example. In some implementations, the first light source 120 may emit light of a different color than the light emitted by the second light source 130. In some embodiments, one or both of the first light source 120 and the second light source 130 may be an imaging light source such that the first and/or second light sources project an image, e.g., an image of logo, a design, or a word. In some implementations in which the second light source 130 is an imaging light source, the image may be projected onto the ground or other surface, for example. In some implementations in which the first light source 120 is an imaging light source, the image may be projected toward the viewer, for example.

Figure 4A:
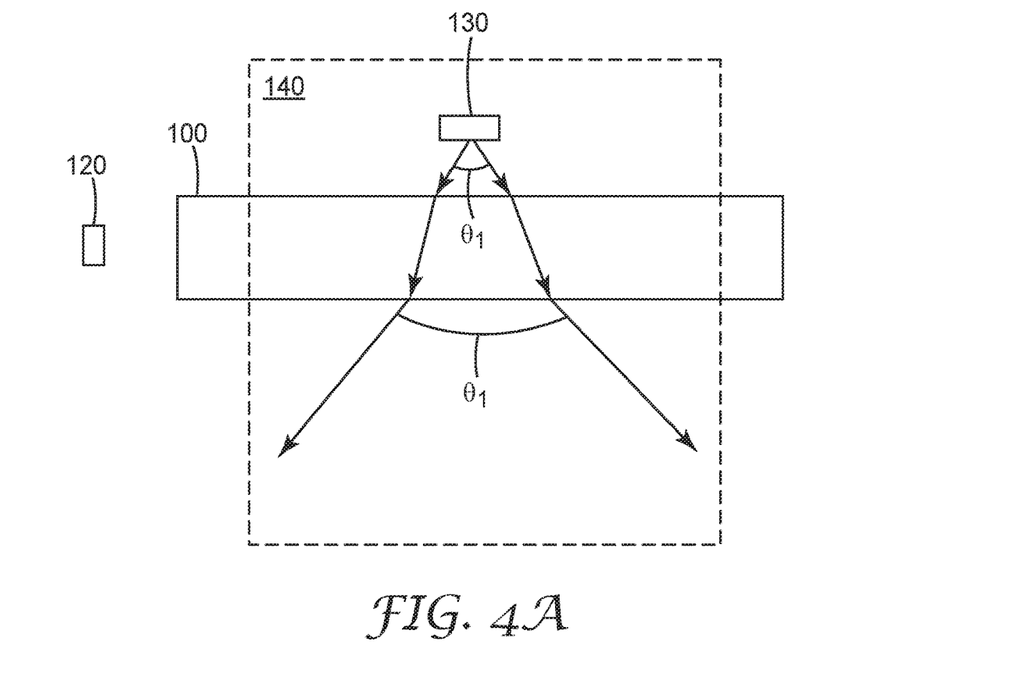
FIGS. 4A and 4B illustrate the divergence of light exiting the lightguide in accordance with some embodiments.

As shown in FIG. 4A, before entering the lightguide 100 through the first side surface 106, light 132 emitted by the second light source 130 has a first divergence, $\theta_1$, in a first plane 140 that substantially bisects the lightguide 100. The light has a different second divergence, $\theta_2$, in the first plane 140 after exiting the lightguide 100 from the second side surface 108. The first divergence may be less than the second divergence by at least 10 degrees, or by at least 20 degrees, for example.

Figure 4B:
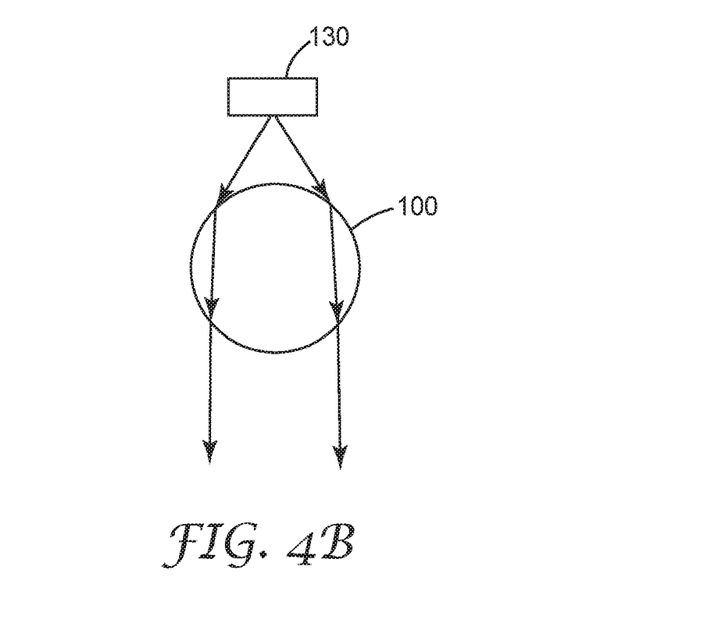

As shown by comparison of the side view of FIG. 4A and the cross sectional view of FIG. 4B, the lightguide 100 may be configured such that light from the second light source 130 that exits the lightguide 100 may be substantially collimated in the xy plane while diverging along the first plane 140 (the xz plane). In some embodiments, the shape of the lightguide 100 may configured to collimate the light entering the lightguide such that light exiting the lightguide in a plane different from plane 140, e.g., an orthogonal plane, is substantially collimated in the orthogonal plane.

In some embodiments, as discussed above, an illumination system may comprise first and second light sources. In some embodiments, an illumination system may include only the first, edge oriented, light source or only the second, side oriented, light source. In any of these embodiments, the illumination system can include extraction features configured to extract the accent lighting and/or functional lighting from the light emitted by the first, edge oriented, light source or the second, side oriented light source.

Figure 5:
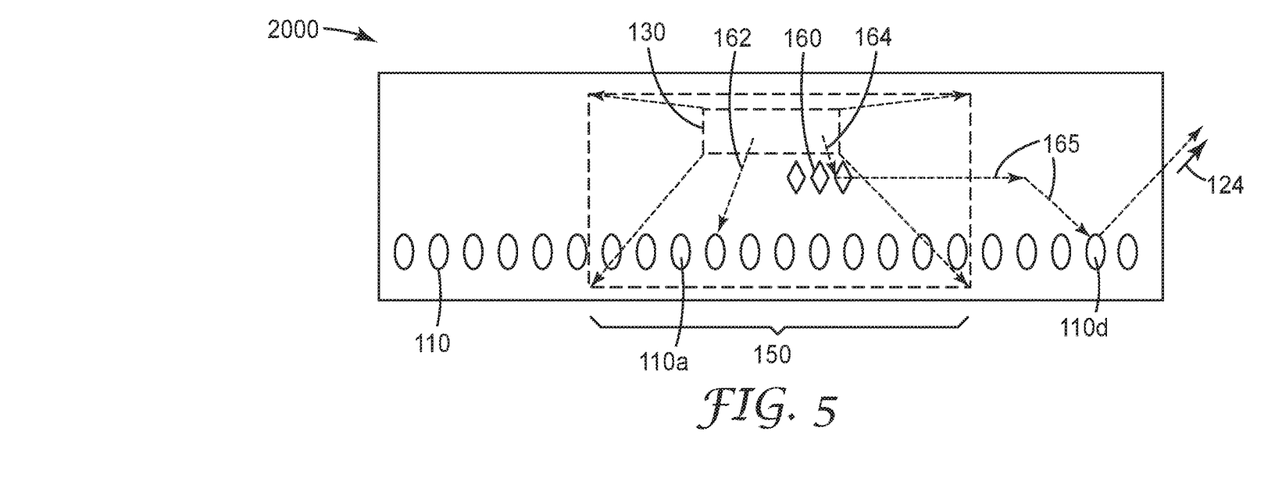
FIGS. 5 and 6 respectively show side and cross sectional views of an illumination system in accordance with some embodiments.
Figure 6:
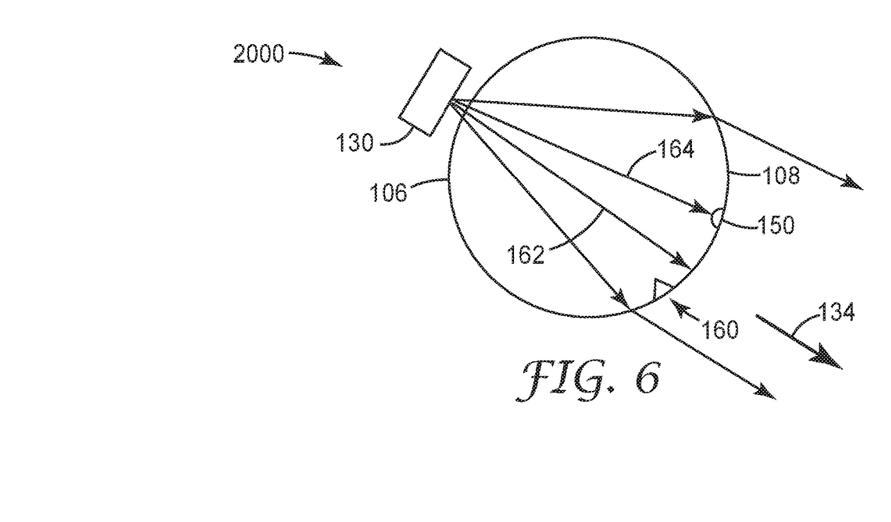

In some embodiments, illustrated by FIGS. 5 and 6, only the second, side oriented, light source in conjunction with suitable extraction features 110, 160 may be used to provide both the first light portion (e.g., accent lighting along first direction 124) and the second light portion (e.g., functional lighting along second direction 134).

FIGS. 5 and 6 respectively show side and cross sectional views of an illumination system 2000 in accordance with some embodiments. The illumination system 2000 includes first light extractors 110 and at least one second light extractor 160 disposed in at least one of the first 106 and second side 108 surfaces of the lightguide 100. The at least one second light extractor 160 is disposed on the first 106 or second side surface 108 such that the light source 130 faces the at least one second light extractor 160.

The first light extractors 110 include a first group 150 of first light extractors 110. As illustrated by FIGS. 5 and 6, a first portion 162 of the light emitted by a light source 130 and entering the lightguide 100 from the first side surface 106 may exit the lightguide 100 from the second side surface 108 after passing through at least one first light extractor 110a in the group 150 of first light extractors 110. The first light portion 162 emitted by the light source 130 may exit the lightguide 100 along the second direction 134 without passing through the at least one second light extractor 160.

In some embodiments, As shown in FIGS. 5 and 6, a second light portion 164 emitted by the light source 130 is redirected by the at least one second light extractor 160, the redirected second light portion 165 propagating within the lightguide 100 toward at least one of the first 102 and second 104 end faces primarily by total internal reflection. The propagating light 165 is extracted by a first light extractor 110d and emerges from the lightguide 100 along a first direction 124.

Figures 7A, 7B:
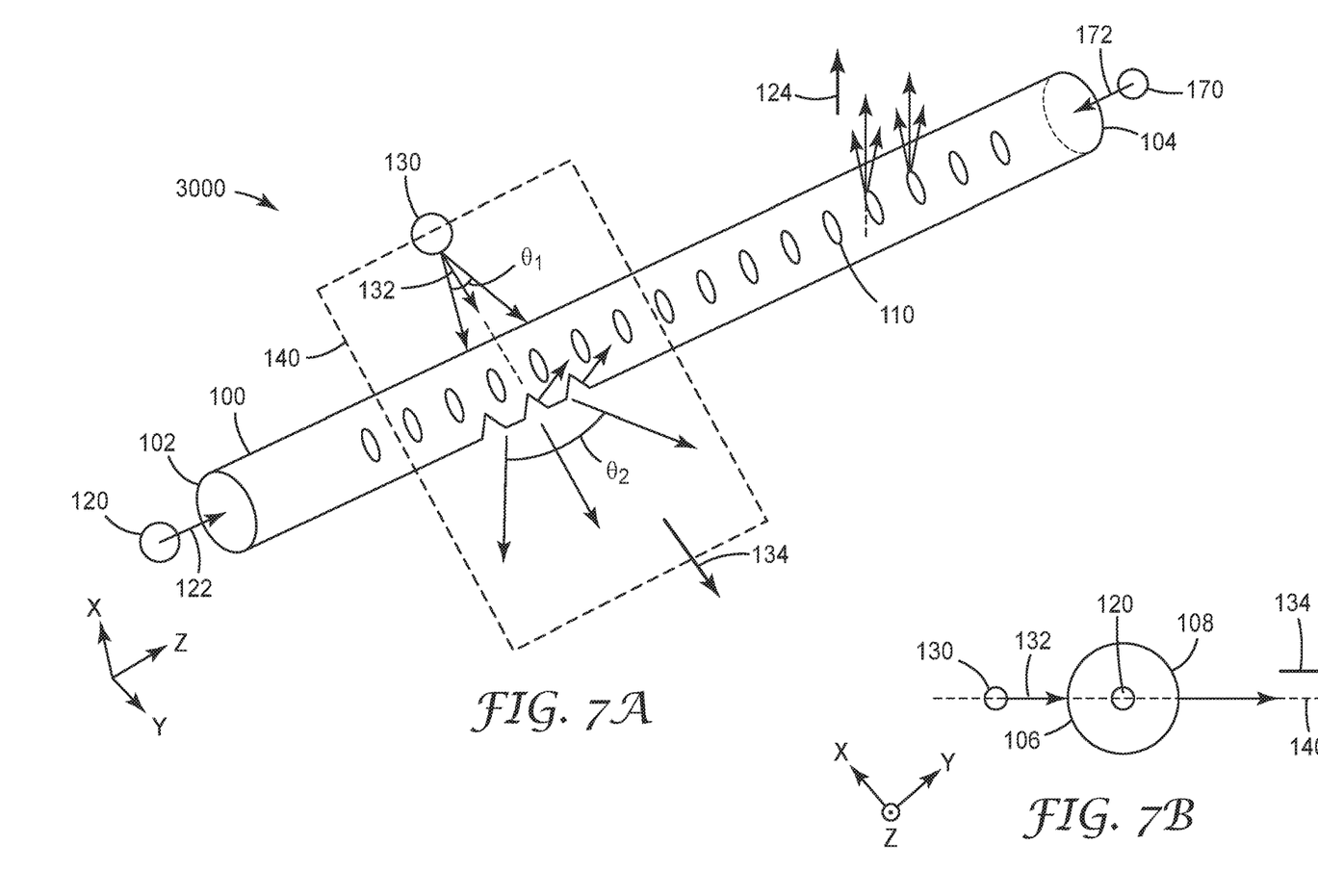
FIG. 7A is a perspective view of an illumination system that includes light sources disposed at opposite edges of the lightguide in accordance with some embodiments.
FIG. 7B is a cross sectional view of the illumination system of FIG. 7A.

According to some embodiments, an illumination system may further include a third light source disposed at the second end face of the lightguide. FIGS. 7A and 7B show perspective and cross sectional views of an illumination system 3000 that is similar in many respects to the illumination system 1000 illustrated by FIGS. 1-4 where like reference numbers refer to like features. Light 172 emitted by the third light source 170 enters the lightguide 100 from the second end face 104, is extracted by the first light extractors 110, and exits the lightguide 100 primarily along the first direction 124. In some implementation, e.g., wherein the lightguide is relatively long, having edge oriented first light sources at both edges of the lightguide facilitates a more consistent illumination along the lightguide. It will also be appreciated that one or more than one side oriented light source disposed along the side of the lightguide may be used to provide the functional lighting.

Figure 8A:
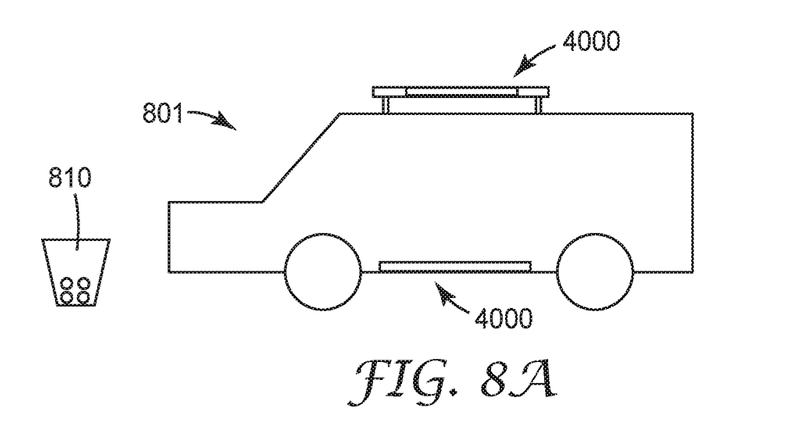
FIGS. 8A and 8B diagrammatically illustrate vehicle illumination systems in accordance with some embodiments.
Figure 8B:
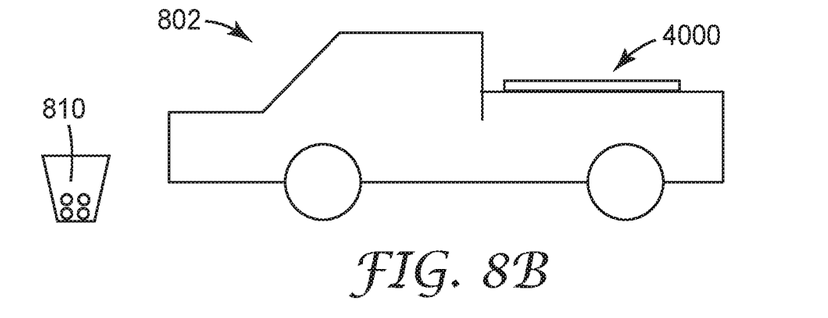

FIGS. 8A and 8B illustrate illumination systems 4000 for a vehicle in accordance with some embodiments. FIG. 8A shows a vehicle 801 that includes one or both of an illuminated roof rack and an illuminated running board or step assist. FIG. 8B shows a truck 802 that includes an illuminated truck bed rail. For example, any of the illumination systems 1000, 2000, 3000 as shown in the Figures and as previously discussed may be used as the vehicle illumination system 4000. Referring to FIG. 8A, the light emitted along the second direction 134 may illuminate the ground. Referring to FIG. 8B, the light emitted along the second direction 134 may illuminate the ground and/or the interior of the truck bed.

With reference to the illumination system 1000 of FIGS. 1 and 2A, for example, a controller 810 can be configured to control the operation of one of both of the edge oriented first light source 120 and the side oriented second light source 130. According to some configurations, the controller 810 may be configured to separately control the operation of the first and the second light sources 120, 130. For example, the controller 810 may be configured to separately control the on/off state and/or the intensity of one of both of the first and second light sources 120, 130.

At least a portion of the controller 810 may be disposed in a vehicle remote key fob that also controls the door and/or trunk locks and/or other vehicle features. In some implementations the controller 810 may be accessed by a driver by pressing buttons on the key fob to flash one or both of the first and second light sources 120, 130 providing a beacon for locating the vehicle in a parking lot. In some implementations, the controller 710 may be configured to automatically and/or upon command reduce the light emitted by the first and/or second light sources 120, 130 when the vehicle is in a particular mode, e.g., drive mode.

Items disclosed herein include:
Item 1. An illumination system comprising:
an elongated lightguide extending along a length direction of the lightguide between opposing first and second end faces of the lightguide and comprising a plurality of first light extractors extracting light that would otherwise be confined within the lightguide in mutually orthogonal lateral directions perpendicular to the length direction and propagate within the lightguide along the length of the lightguide primarily by total internal reflection;

at least one first light source disposed at the first end face of the lightguide, light emitted by the first light source entering the lightguide from the first end face and extracted by the first light extractors exiting the lightguide primarily along a first direction different than the length direction; and at least one second light source disposed along the length of the lightguide between the first and second end faces, light emitted by the second light source entering the lightguide from a first side surface of the lightguide and exiting the lightguide from a different second side surface of the lightguide along a second direction different than the first and length directions, the first and second side surfaces extending between the first and second end faces, light emitted by the second light source having a first divergence in a first plane before entering the lightguide through the first side surface and a different second divergence in the first plane after exiting the lightguide from the second side surface.

Item 2. The illumination system of item 1, wherein at least a first group of the first light extractors in the plurality of first light extractors are disposed in at least one of the first and second side surfaces, so that light emitted by the second light source and entering the lightguide from the first side surface exits the lightguide from the second side surface after passing through at least one first light extractor in the first group of first light extractors.

Item 3. The illumination system of any of items 1 through 2, further comprising at least one second light extractor disposed on the first or second side surface, so that a first light portion emitted by the second light source enters the lightguide from the first side surface and exits the lightguide from the second side surface without going through the at least one second light extractor, and a different second light portion emitted by the second light source is redirected by the at least one second light extractor, the redirected second light portion propagating within the lightguide toward at least one of the first and second end faces primarily by total internal reflection.

Item 4. The illumination system of any of items 1 through 3, wherein the lightguide is non-planar.

Item 5. The illumination system of any of items 1 through 4, wherein at least some of the first light extractors in the plurality of first light extractors are protrusions formed on an exterior surface of the lightguide.

Item 6. The illumination system of any of items 1 through 5, wherein at least some of the first light extractors in the plurality of first light extractors are notches formed in an exterior surface of the lightguide.

Item 7. The illumination system of any of items 1 through 6, wherein the lightguide has a round cross-sectional profile along the length direction.

Item 8. The illumination system of any of items 1 through 6, wherein the lightguide has a circular cross-sectional profile along the length direction.

Item 9. The illumination system of any of items 1 through 6, wherein the lightguide has an elliptical cross-sectional profile along the length direction.

Item 10. The illumination system of any of items 1 through 6, wherein the lightguide has a mushroom cross-sectional profile along the length direction.

Item 11. The illumination system of any of items 1 through 6, wherein the lightguide has a polygonal cross-sectional profile along the length direction.

Item 12. The illumination system of any of items 1 through 6, wherein the lightguide has a rectangular cross-sectional profile along the length direction.

Item 13. The illumination system of any of items 1 through 6, wherein the lightguide has a square cross-sectional profile along the length direction.

Item 14. The illumination system of any of items 1 through 6, further comprising a third light source disposed at the second end face of the lightguide, light emitted by the third light source entering the lightguide from the second end face and extracted by the first light extractors exiting the lightguide primarily along the first direction.

Item 15. The illumination system of any of items 1 through 14, wherein at least one of the first and second light sources comprises one or more of a light emitting diode, a filament based bulb, and an incandescent lamp.

Item 16. The illumination system of any of items 1 through 15, wherein an angle between the first and second directions is in a range from about 20 degrees to about 100 degrees.

Item 17. The illumination system of any of items 1 through 16, wherein the first plane substantially bisects the lightguide.

Item 18. The illumination system of any of items 1 through 17, wherein the first divergence is less than the second divergence by at least 10 degrees.

Item 19. The illumination system of any of items 1 through 17, wherein the first divergence is less than the second divergence by at least 20 degrees.

Item 20. The illumination system of any of items 1 through 19, wherein the light emitted by the second light source having the first divergence in a first plane before entering the lightguide through the first side surface and the different second divergence in the first plane after exiting the lightguide from the second side surface is substantially collimated by the lightguide in a plane that bisects the lightguide other than the first plane.

Item 21. The illumination system of any of items 1 through 20, wherein the first light source emits light of a first color and the second light source emits light of a different, second color.

Item 22. The illumination system of any of items 1 through 21, wherein at least one of the first and second light sources projects an image.

Item 23. The illumination system of any of items 1 through 22, wherein the light emitted along the first direction has an intensity that is less than 20% of the intensity of the light emitted along the second direction.

Item 24. The illumination system of any of items 1 through 23, further comprising a controller configured to control operation of at least one of the first and second light sources.

Item 25. The illumination system of any of items 1 through 24, wherein the controller is configured to separately control the operation of the first and the second light sources.

Item 26. An illumination system comprising:

an elongated lightguide extended along a length direction of the lightguide between opposing first and second end faces of the lightguide and comprising at least one first light extractor and at least one second light extractor disposed between the first and second end faces;

a light source disposed along the length of the lightguide between the first and second end faces and facing the at least one second light extractor, a second light portion emitted by the light source redirected by the at least one second light extractor and propagating within the lightguide toward at least one of the first and second end faces primarily by total internal reflection, the propagating light being extracted by the at least one first light extractor and exiting the lightguide primarily along a first direction, a first light portion emitted by the light source entering the lightguide from a first side surface of the lightguide and exiting the lightguide from a different second side surface of the lightguide primarily along a different second direction without going through the at least one second light extractor.

Item 27. The illumination system of item 26, wherein the second light portion goes through the at least one first light extractor before exiting the lightguide.

Item 28. An illumination system for a vehicle comprising:
a structure configured to mount to the vehicle, the structure comprising:
an elongated lightguide extending along a length direction of the lightguide between opposing first and second end faces of the lightguide and comprising a plurality of first light extractors extracting light that would otherwise be confined within the lightguide in mutually orthogonal lateral directions perpendicular to the length direction and propagate within the lightguide along the length of the lightguide primarily by total internal reflection;
at least one first light source disposed at the first end face of the lightguide, light emitted by the first light source entering the lightguide from the first end face and extracted by the first light extractors exiting the lightguide primarily along a first direction different than the length direction; and
at least one second light source disposed along the length of the lightguide between the first and second end faces, light emitted by the second light source entering the lightguide from a first side surface of the lightguide and exiting the lightguide from a different second side surface of the lightguide along a second direction different than the first and length directions, the first and second side surfaces extending between the first and second end faces, light emitted by the second light source having a first divergence in a first plane before entering the lightguide through the first side surface and a different second divergence in the first plane after exiting the lightguide from the second side surface.

Item 29. The vehicle illumination system of item 28, wherein the structure comprises a roof rack, a running board, a step assist or a truck bed rail.

Item 30. The vehicle illumination system of any of items 28 through 29, wherein the light emitted along the second direction illuminates the ground.

Item 31. The vehicle illumination system of any of items 28 through 30, wherein the light emitted along the second direction illuminates a truck bed of the vehicle.

Item 32. The vehicle illumination system of any of items 28 through 31, further comprising a controller configured to control one or both of an on/off state and an intensity of the first and second light sources.

Item 33. The vehicle illumination system of item 32 wherein at least a portion of the controller is disposed in a vehicle remote key fob.

Item 34. The vehicle illumination system of item 32, wherein the controller is configured to automatically reduce the intensity of the light emitted by the second light source while the vehicle is in drive mode.

Item 35. The vehicle illumination system of item 32, wherein the controller is configured to separately control operation of the first and the second light sources.

Item 36. The vehicle illumination system of item 32, wherein controller is configured to cause at least one of the first and the second light sources to flash on and off.

Various modifications and alterations of this invention will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. An illumination system comprising:
an elongated lightguide extending along a length direction of the lightguide between opposing first and second end faces of the lightguide and comprising a plurality of first light extractors extracting light that would otherwise be confined within the lightguide in mutually orthogonal lateral directions perpendicular to the length direction and propagate within the lightguide along the length of the lightguide primarily by total internal reflection;
at least one first light source disposed at the first end face of the lightguide, light emitted by the first light source entering the lightguide from the first end face and extracted by the first light extractors exiting the lightguide primarily along a first direction different than the length direction; and
at least one second light source disposed along the length of the lightguide between the first and second end faces, light emitted by the second light source entering the lightguide from a first side surface of the lightguide and exiting the lightguide from a different second side surface of the lightguide along a second direction different than the first and length directions, the first and second side surfaces extending between the first and second end faces, the second side surface being rounded, such that light emitted by the second light source has a first divergence in a first plane before entering the lightguide through the first side surface and a different second divergence in the first plane after exiting the lightguide from the second side surface, and is substantially collimated in a second plane perpendicular to the first plane.

2. The illumination system of claim 1, wherein at least a first group of the first light extractors in the plurality of first light extractors are disposed in at least one of the first and second side surfaces, so that light emitted by the second light source and entering the lightguide from the first side surface exits the lightguide from the second side surface after passing through at least one first light extractor in the first group of first light extractors.

3. The illumination system of claim 1 further comprising at least one second light extractor disposed on the first or second side surface, so that a first light portion emitted by the second light source enters the lightguide from the first side surface and exits the lightguide from the second side surface without going through the at least one second light extractor, and a different second light portion emitted by the second light source is redirected by the at least one second light extractor, the redirected second light portion propagating within the lightguide toward at least one of the first and second end faces primarily by total internal reflection.

4. The illumination system of claim 1 further comprising a third light source disposed at the second end face of the lightguide, light emitted by the third light source entering the lightguide from the second end face and extracted by the first light extractors exiting the lightguide primarily along the first direction.

5. The illumination system of claim 1, wherein an angle between the first and second directions is in a range from about 20 degrees to about 100 degrees.

6. The illumination system of claim 1, wherein the first plane substantially bisects the lightguide.

7. The illumination system of claim 1, wherein the first divergence is less than the second divergence by at least 20 degrees.

8. The illumination system of claim 1, wherein the first light source emits light of a first color and the second light source emits light of a different, second color.

9. The illumination system of claim 1, wherein at least one of the first and second light sources projects an image.

10. The illumination system of any of claim 1, wherein the light emitted along the first direction has an intensity that is less than 20% of the intensity of the light emitted along the second direction.

11. An illumination system for a vehicle comprising:
a structure configured to mount to the vehicle, the structure comprising:
an elongated lightguide extending along a length direction of the lightguide between opposing first and second end faces of the lightguide and comprising a plurality of first light extractors extracting light that would otherwise be confined within the lightguide in mutually orthogonal lateral directions perpendicular to the length direction and propagate within the lightguide along the length of the lightguide primarily by total internal reflection;
at least one first light source disposed at the first end face of the lightguide, light emitted by the first light source entering the lightguide from the first end face and extracted by the first light extractors exiting the lightguide primarily along a first direction different than the length direction; and
at least one second light source disposed along the length of the lightguide between the first and second end faces, light emitted by the second light source entering the lightguide from a first side surface of the lightguide and exiting the lightguide from a different second side surface of the lightguide along a second direction different than the first and length directions, the first and second side surfaces extending between the first and second end faces, the second side surface being rounded, such that light emitted by the second light source has a first divergence in a first plane before entering the lightguide through the first side surface and a different second divergence in the first plane after exiting the lightguide from the second side surface, and is substantially collimated in a second plane perpendicular to the first plane.

12. The vehicle illumination system of claim 11, wherein the structure comprises a roof rack, a running board, a step assist or a truck bed rail.

13. The vehicle illumination system of claim 11, wherein the light emitted along the second direction illuminates the ground.

14. The vehicle illumination system of claim 11, wherein the light emitted along the second direction illuminates a truck bed of the vehicle.

15. The vehicle illumination system of claim 11, further comprising a controller configured to control one or both of an on/off state and an intensity of the first and second light sources.

16. The vehicle illumination system of claim 15 wherein at least a portion of the controller is disposed in a vehicle remote key fob.

17. The vehicle illumination system of claim 15, wherein the controller is configured to automatically reduces the light emitted by the second light source while the vehicle is in drive mode.

* * * * *